United States Patent [19]

Hicks

[11] Patent Number: 4,977,972
[45] Date of Patent: Dec. 18, 1990

[54] TRIDEM DRIVE AXLE SYSTEM

[75] Inventor: Bradford W. Hicks, Kalamazoo, Mich.

[73] Assignee: Eaton Corporation, Cleveland, Ohio

[21] Appl. No.: 292,677

[22] Filed: Jan. 3, 1989

[51] Int. Cl.⁵ .............................................. B60K 17/16
[52] U.S. Cl. .................................... 180/24.04; 180/22
[58] Field of Search ............................... 180/24.09, 22

[56] References Cited

U.S. PATENT DOCUMENTS

| | | | |
|---|---|---|---|
| 2,383,873 | 8/1945 | MacPherson | 180/24.09 |
| 3,146,842 | 1/1964 | Nelson et al. | 180/22 |
| 3,388,760 | 6/1968 | Christie | 180/22 |
| 3,706,350 | 12/1972 | Bokovoy | 180/24.09 |
| 3,753,376 | 8/1973 | Ribeiro | 180/24.09 |
| 4,050,534 | 9/1977 | Nelson et al. | 180/24.09 |
| 4,823,897 | 4/1989 | Wohlfarth | 180/24.09 |

FOREIGN PATENT DOCUMENTS 743027  1/1956  United Kingdom ............. 280/24.09

Primary Examiner—Kenneth R. Rice
Attorney, Agent, or Firm—H. D. Gordon

[57] ABSTRACT

A tridem rear drive axle system (100) comprising a front-rear drive axle assembly (112) a middle-rear drive axle assembly (22) and a rear-rear drive assembly (24) is provided wherein torque is distributed substantially equally to each of the three rear drive axles. The front-rear drive axle assembly (112) includes a first input shaft (118) for driving the front-rear drive axle gear set and a second input shaft (114) for driving a through shaft (116) drivingly connected to the middle-rear drive axle assembly (22) which is of a standard forward tandem axle design. A transfer case (102) having a first output shaft (108) for connection to the first input shaft and a second output shaft (106) for connection to the second input shaft is provided. The transfer case provides twice the torque to the second transfer case output shaft than is provided to the first transfer case output shaft.

8 Claims, 4 Drawing Sheets

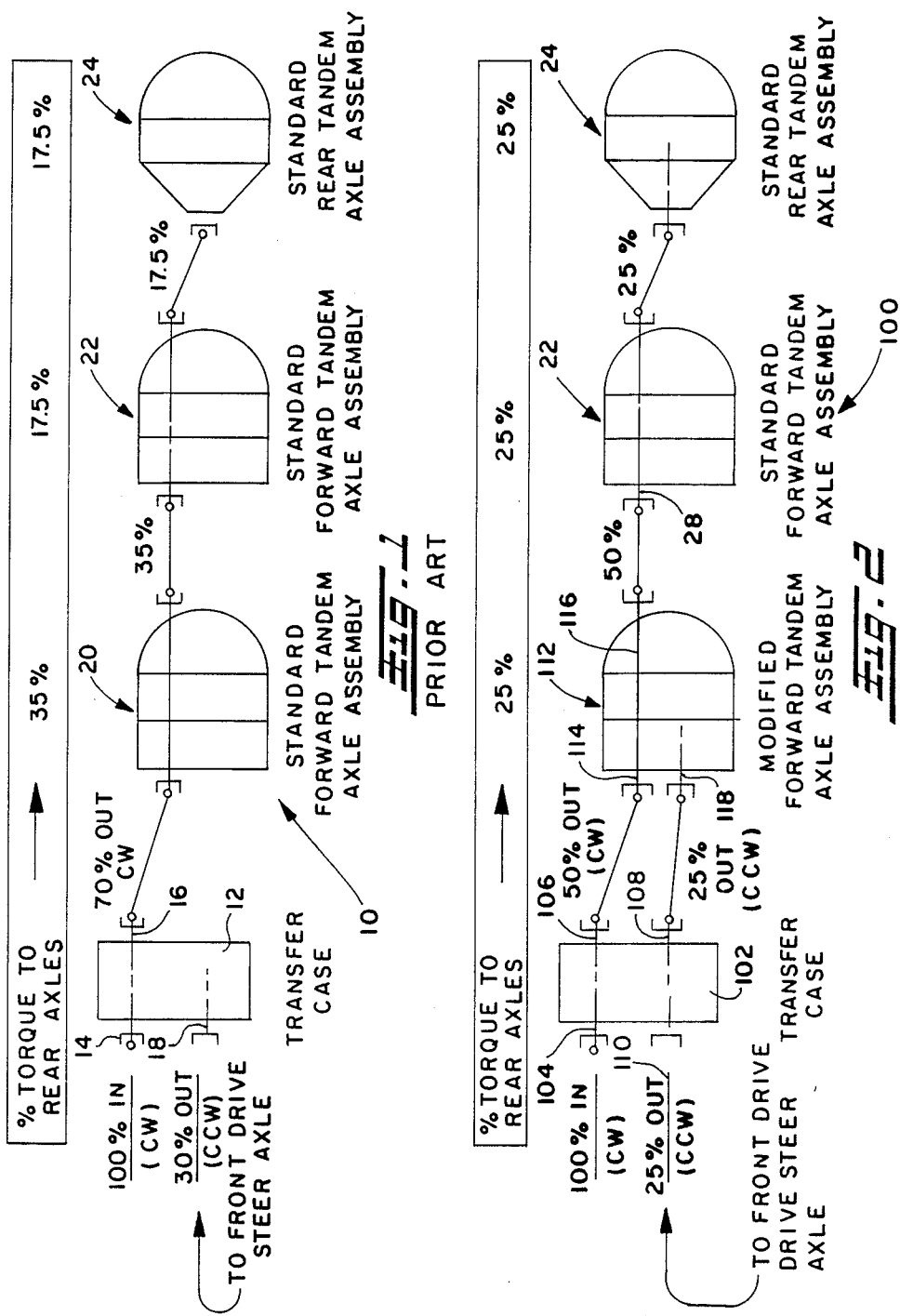

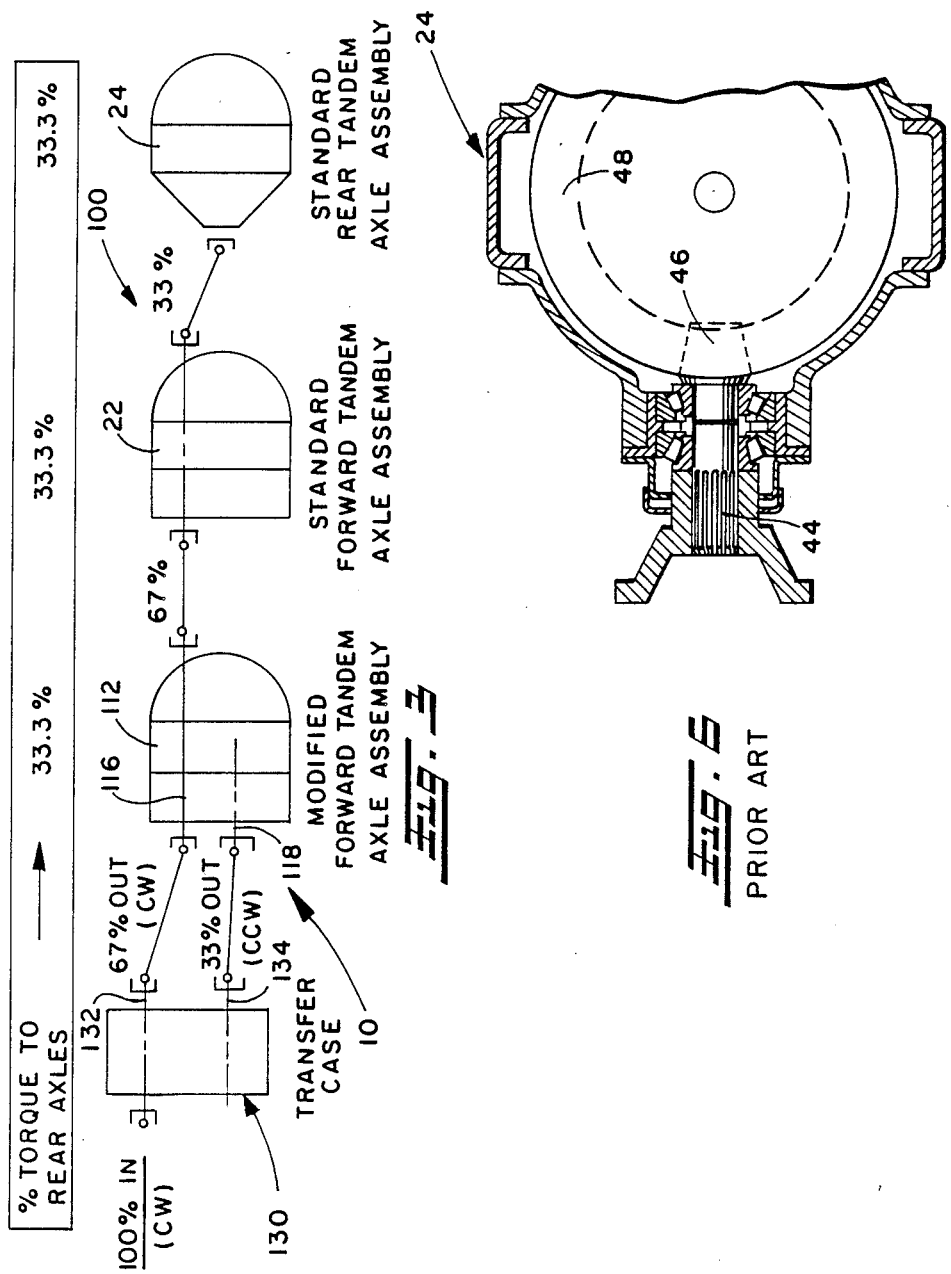

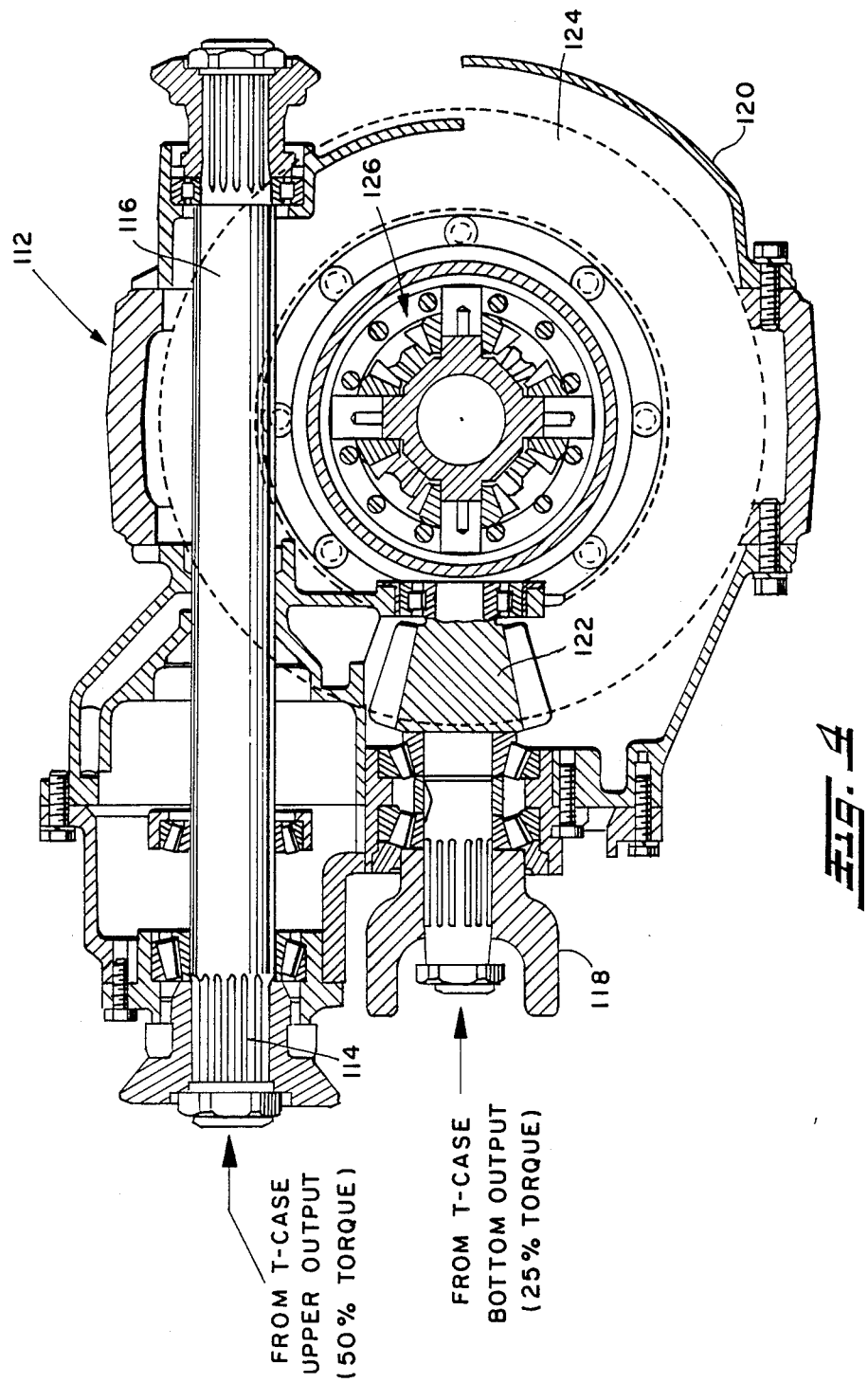

TRIDEM DRIVE AXLE SYSTEM

BACKGROUND OF THE INVENTION

1. Field of the Invention:

The present invention relates to a tridem rear drive axle system for use in "8×8", or "8×6" or similar type vehicles. In particular, the present invention relates to a tridem rear drive axle system utilizing a transfer case having two output shafts extending to the front-rear drive axle assembly and to a front-rear drive axle assembly having two input shafts, one driving the front-rear drive axle gearing and the other connected to a through shaft drivingly connected to the middle-rear drive axle assembly.

2. Description of the Prior Art:

Tandem and tridem rear drive axle systems having two or three rear drive axle assemblies, respectively, are well known in the prior art as may be seen by reference to U.S. Pat. Nos. 3,000,456; 3,146,842; 3,388,760 and 3,706,350, the disclosures of which are hereby incorporated by reference. Transfer cases for transferring vehicle transmission output torque to multiple rear drive axles and/or to a front drive steer axle are known in the prior art as may be seen by reference to U.S. Pat. Nos. 3,753,376; 3,780,821 and 2,158,320, the disclosures of which are hereby incorporated by reference. MultiPle drive axle systems wherein various so-called "torque proportioning" differentials, usually planetary type differentials, are utilized to proportion torque more advantageously between the various drive axles are also well known in the prior art. Briefly, torque proportioning differentials are those non-standard differentials which distribute input torque on other than a fifty-fifty basis to the two outputs (side gears) thereof.

While the multiple drive axle tandem and tridem rear drive axle systems of the prior art are very commercially successful and widely used, they are not totally satisfactory as substantially equal torque distribution to all of the drive axles is not provided, one of the tridem drive axle assemblies works twice as hard as the other two, elaborate and costly torque proportioning differentials in one or more of the drive axle assemblies are required, complicated and awkward vehicle drive line layouts are required and/or expensive specialized tooling, not easily justified at relatively low volumes, is required.

SUMMARY OF THE INVENTION

In accordance with the present invention, the drawbacks of the prior art are minimized or overcome by the provision of a tridem drive axle system, which when used in conjunction with a properly configured transfer case, allows for an equal torque distribution to all three drive axles of the tridem rear bogey, and which facilitates chassis installation and drive line layout. The tridem drive axle system of the present invention avoids the condition in normal tridems in which the first drive axle works twice as hard as the other two drive axles and accomplishes this without the need for an elaborate torque proportioning differential in the forward or first rear drive axle axle, i.e. the "front-rear" axle, the development and tooling costs of which are not easily justified for the relatively low volume market for drive axle systems of this type.

The above is accomplished by the provision of a forward or "front-rear" drive axle assembly having two input shafts, the first input shaft drivingly engaged with the forward axles drive gearing and a second of which is connected to a through shaft extending to the middle-rear drive axle assembly which is a relatively standard forward tandem axle assembly connected in a conventional manner to a rear-rear axle of a standard rear tandem axle design. The first input shaft to the forward-rear drive axle assembly is for connection to a first transfer case output shaft and the second forward-rear drive axle input shaft is for connection to a second transfer case output shaft. The first transfer case output shaft is provided with approximately one-half of the torque with which the second output shaft is provided. As the middle rear drive axle assembly, which is a relatively standard forward tandem drive axle assembly, will split the input torque provided thereto, each of the three tridem drive axle assemblies is provided with a substantially equal input torque, namely that amount of input torque provided to the forward-rear drive axle assembly.

Accordingly, it is object of the present invention to provide a new and improved tridem drive axle system allowing for equal torque distribution to all three drive axle assemblies, facilitating chassis installation and drive line layout and not requiring the use of a torque proportioning differential in one or more of the rear drive axle assemblies.

This and other objects and advantages of the present invention will become apparent from a reading of the description of the preferred embodiment taken in connection with the attached drawings.

BRIEF DESCRIPTION OF THE DRAWINGS

FIG. 1 is a schematic illustration of a typical prior art tridem drive axle system for a 8×8 vehicle.

FIG. 2 is a schematic illustration of the tridem drive axle system of the present invention as utilized in an 8×8 vehicle.

FIG. 3 is a schematic illustration of the tridem drive axle system of the present invention as utilized in an 8×6 vehicle.

FIG. 4 is an axial cross-sectional view of the front-rear drive axle assembly of the present invention.

FIG. 6 is a partial axial cross-sectional view of the rear-rear drive axle assembly of the present invention.

DESCRIPTION OF THE PREFERRED EMBODIMENT

Figure 5:
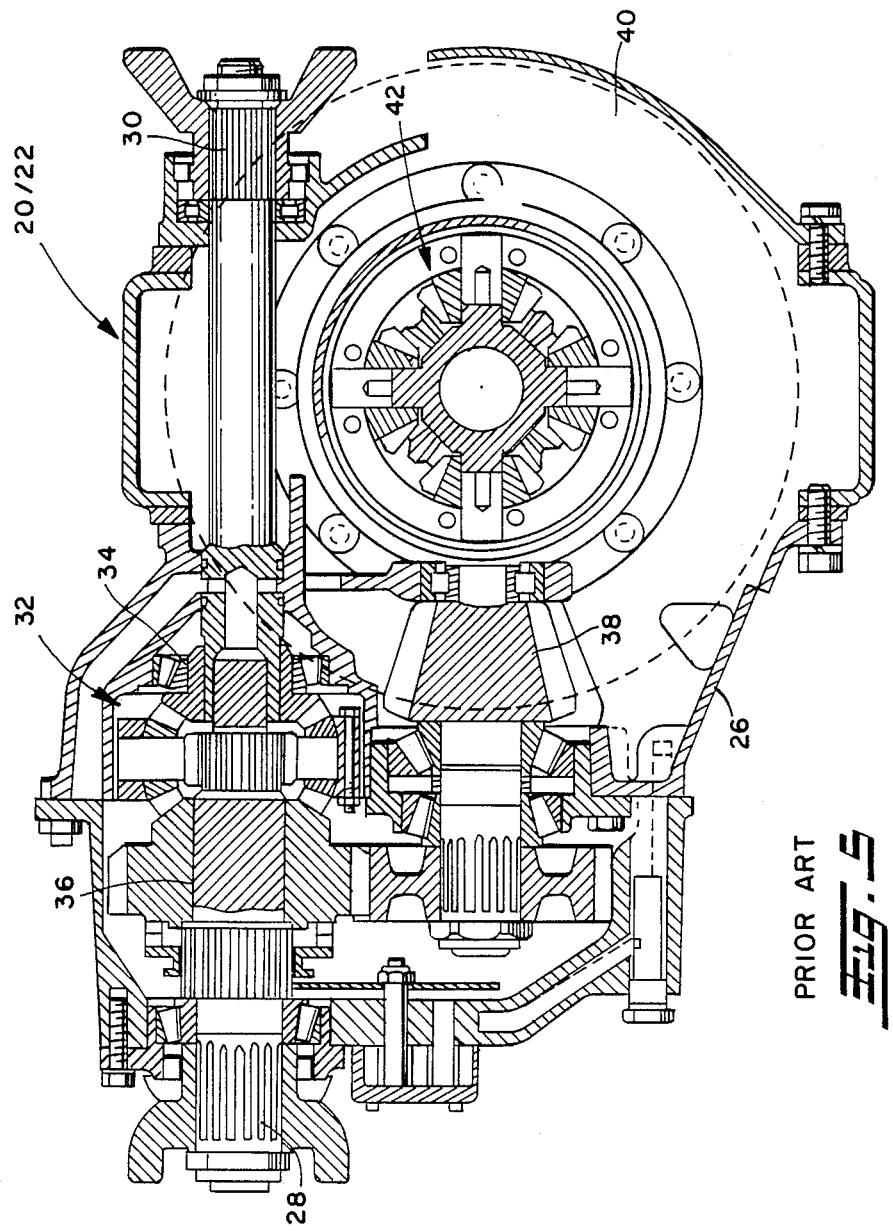
FIG. 5 is an axial cross-sectional view of the middle-rear drive axle assembly of the present invention.

In this disclosure, certain terminology will be used for convenience in reference only and will not be limiting. For example, the terms "inward" and "outward" will refer to directions toward and away from, respectively, the geometric center of the apparatus being described. The terms "rightwardly" and "leftwardly" will refer to directions in the Figures. The terms "forward" and "rearward" will refer to the direction relative to the front and rear, respectively, of a vehicle in which the apparatus is normally mounted. The terms "clockwise" and "counterclockwise" will refer to directions of rotation of the members being described as viewed from the lefthand side of FIG. 1. The foregoing applies to normal derivatives of terms specifically mentioned and to terms of similar import.

The present invention relates to tridem rear drive axle systems for vehicles such as 8×8 vehicles and 8×6 vehicles. An 8×8 vehicle is one having 8 wheels, all of which are driven. Abbreviations such as 8×8 and 8×6 will be used hereinafter, the first numeral denoting the total number of vehicle wheels and the second numeral denoting the total number of driven wheels.

The essence of a tridem drive axle system is its ability to drive more than one rear drive axle, specifically three or more rear drive axles. This is typically accomplished by means of a power (or torque) divider, usually a differential in which one of the differential side gears transmits, under ideal operating conditions, a certain percentage of the input torque to the first drive axle while the other differential side gear transmits the remaining torque by means of an output shaft to a subsequent assembly including at least a second and third drive axle.

Referring to FIG. 1, a typical Prior art tridem rear drive axle assembly 10 is illustrated as it is applied to an 8×8 vehicle. A transfer case 12 has an input shaft 14 for receiving 100% of the drive torque from the vehicle engine and transmission. The transfer case 12 is provided with a rearward facing output shaft 16 receiving approximately 70% of the total input torque and a forward facing output shaft 18 connected to the front drive steer axle (not shown) receiving approximately 30% of the total input torque.

The prior art tridem system 10 comprises a first or forward-rear drive axle assembly 20, a second or middle-rear drive axle assembly 22 and a third or rear-rear drive axle assembly 24. The first and second drive axle assemblies, 20 and 22, are substantially identical and are of the standard forward tandem axle assembly structure well known in the prior art and illustrated in above-mentioned U.S. Pat. Nos. 4,050,534; 3,146,842 and 3,388,760. The third axle 24 is a standard rear tandem axle assembly of the type illustrated in the above-mentioned U.S. Patents. Briefly, torque from transfer case output shaft 16 is received by the first axle 20 where one-half of the torque is directed to the first axle drive gear set and the remaining one-half of the torque is passed on to the second axle 22 where it is again divided evenly between the second axle gear set and the third axle 24. The result is that the first axle 20 receives 50% of the total tridem torque (in this example, 35% of the total drive train system torque), while the second and third axles each receive 25% of the total tridem torque (17.5% of the systems torque). This unequal distribution severely limits the durability of the rear drive axle system and, indeed, will offer no substantial improvement in durability over a standard tandem axle system even though there is one additional drive axle assembly available for driving.

The structure and function of the front-rear drive axle assembly 20 and the middle-rear drive axle assembly 22, both substantially standard forward tandem axle assemblies, may be seen in greater detail by reference to FIG. 5. Briefly, each of the assemblies comprises a multiple-piece housing 26 within a which are a rotatably supported input shaft 28 and axially aligned output shaft 30. Input shaft 28 drives an interaxle differential assembly 32 having a first side gear output member 34 drivingly connected to output shaft 30 and a second side gear output member 36 for driving the axle assembly drive gearing set which, as is well known in the prior art, comprises a drive pinion 38, a ring gear 40 and an intra-axle differential assembly 42, the side gears of which drive the axle shafts. Under ideal operating conditions each of the interaxle differential side gears, 34 and 36, will receive about 50% of the torque provided to the input shaft 28.

The structure and function of the third drive axle assembly, rear-rear axle assembly 24, may be seen by reference to FIG. 6. Briefly, axle assembly 24 is a standard rear tandem axle assembly comprising an input shaft 44 for driving the assembly gear set comprising drive pinion 46 and ring gear 48. Ring gear 48 is drivingly connected to an intra-axle differential assembly (not shown) for driving the axle shafts as is well known in the prior art.

The tridem drive axle system 100 of the present invention, as utilized in an 8×8 vehicle, is schematically illustrated in FIG. 2. A transfer case 102 is provided having an input shaft 104 receiving 100% of the drive torque from the vehicle engine and transmission. The transfer case 102 is provided with three output shafts, a first rearward facing output shaft 106 provided with 50% of the total transfer case output torque, a second rearward facing output shaft 108 provided with 25% of the total transfer case output . torque and a third forwardly facing output shaft 110 for connection to the front drive steer axle (not shown) which is provided with 25% of the total transfer case output torque.

The tridem rear drive axle system 100 of the present invention comprises a unique first, or forward-rear, axle assembly 112, a second or middle-rear drive axle assembly 22 substantially structurally and functionally identical to the second rear axle assembly 22 illustrated in FIG. 1, and a third or rear-rear axle assembly 24 substantially identical to the third axle assembly 24 discussed in connection with FIG. 1 above. First axle assembly 112 includes a first input shaft 114 integral with or connected to a through shaft 116 directly drivingly connected to the input shaft 28 of the middle-rear drive axle assembly 22. Front-rear drive axle assembly includes a second input shaft 118 connected to the second transfer case output shaft 108 for driving the first axle assembly gear set.

Output torque from the transfer case upper output shaft 106 is received by the through shaft 116 of the first axle assembly 112 and passed therethrough to the second axle assembly 22. Second axle assembly 22 is a standard forward tandem axle assembly and therefore will distribute this torque equally between the second axle assembly 22 and third axle assembly 24. Accordingly, each of the tridem rear drive axle assemblies, namely axles 112, 22 and 24, each receive an equal percentage of the torque (in this example, 25% of the total engine/transmission torque) while the front drive steer axle (not shown) receives an equal Percentage (25%) of the engine/transmission torque. This is a configuration which provides improved torque distribution and a very clean chassis and drive line layout.

Referring to FIG. 4, the structure and function of the front-rear drive axle assembly 112 may be seen in greater detail. Front-rear drive axle assembly 112 includes an upper or first forwardly facing input shaft 114 connected to and/or integral with a through shaft 116, both of which are rotatably supported by means of suitable bearings in a multiple piece housing 120. A lower or second forwardly facing input shaft 118 is provided for connection to the lower or second transfer case output shaft 108 and is drivingly connected to the front-rear drive axle assembly gear set comprising a drive pinion 122, a ring gear 124 and a suitable intra-axle differential assembly 126 for driving the axle shafts.

Referring to FIG. 3, the use of a tridem drive axle assembly 100 of the Present invention in a 8×6 vehicle is illustrated. Briefly, in an 8×6 vehicle, a transfer case 130 having only two output shafts, an upper or first output shaft 132 for connection to the front-rear drive axle through shaft 116 and a second lower output shaft 134 for connection to the forward-rear input shaft 118 for driving the forward-rear gear set is provided. In this configuration, upper output shaft 132 is provided with 67% of the total transfer case output torque while the lower output shaft 134 is provided with 33% of the total transfer case output torque. As may be seen, in this configuration, the tridem drive axle system provides an equal distribution of torque between each of the drive axle assemblies (in this example, 33% of total engine/transmission torque).

In view of the above, it may be seen that the improved tridem rear drive axle system 100 of the present invention allows for an equal torque distribution to all three of the tridem system drive axles, facilitates chassis installation and driveline layout and accomplishes the above without the need for an elaborate torque proportioning differential in the front axle, the development and tooling costs for which are difficult t justify in relatively low volume markets.

Although the present invention has been described in its preferred forms with a certain degree of particularity, it is understood that the present disclosure of the preferred form has been made only by way of example and that numerous changes in the details of construction and combination and arrangement of the parts may be resorted to without departing from the spirit and scope of the invention as hereinafter claimed.

I claim:

1. A front-rear drive axle assembly (112) for a multiple rear drive axle system (100) comprising at least a front-rear, a middle-rear and a rear-rear drive axle assembly, said front-rear drive axle assembly comprising a housing (120), a drive gear set (122,124) and a first input shaft (118) rotatably supported in and extending forwardly from said housing in driving connection with said drive gear set;

said front rear drive axle assembly characterized by;

a second input shaft (114) rotatably supported in and extending forwardly from said housing and drivingly connected to an output shaft (116) rotatably supported in said housing and extending rearwardly therefrom, said second input shaft and said output shaft noncoaxial with and independently rotatable relative to said first input shaft.

2. The axle assembly of claim 1 wherein said drive gear set comprises a pinion gear (122) driven by said first input shaft, a ring gear (124) in meshing engagement with said pinion gear and an intra-axle differential assembly (126).

3. The drive axle assembly of claim 2 wherein said second input shaft and said output shaft are coaxial.

4. The drive axle assembly of claim 3 wherein said second input shaft and said output shaft are coupled for joint rotation 5. The drive axle assembly of claim 4 wherein said second input shaft is integral with said output shaft.

6. The drive axle assembly of claim 3 wherein said second input shaft and said output shaft are parallel with said first input shaft.

7. A tridem rear drive axle system (100) for an 8×8 vehicle having a front drive steer axle, said tridem rear drive axle system comprising a front-rear drive axle assembly (112), a middle-rear drive axle assembly (22) and a rear-rear drive axle assembly (24), said system characterized by;

said front-rear drive axle assembly (112) comprising a housing (120), a front-rear drive gear set (122,124), a first input shaft (118) in driving connection with said front-rear drive gear set and rotatably supported in and extending forwardly from said housing and a second input shaft (114) rotatably supported in and extending forwardly from said housing and drivingly connected to an output shaft (116) rotatably supported in said housing and extending rearwardly therefrom, said output shaft in driving engagement with a third input shaft (28) rotatably supported in said middle-rear drive axle assembly and in driving engagement with a drive gear set (38,40,42) of said middle-rear drive axle assembly, said second input shaft and said output shaft noncoaxial with and independently rotatable relative to said first input shaft;

said middle-rear driven axle assembly (22) comprising a housing (26) rotatably supporting said third input shaft (28) and an interaxle differential assembly (32) driven by said third input shaft, said interaxle differential including a first side gear (34) in driving relation with said rear-rear drive axle assembly (24) and a second side gear (36) in driving relation with said middle-rear drive axle drive gear set, said interaxle differential proportioning input torque from said third input shaft between said first and said second side gears on a substantially equal basis under ideal operating conditions; and a transfer case (102) having an input shaft (104) driven by a vehicular prime mover of a 8×8 vehicle and having a first rearwardly extending transfer case output shaft (108) connected to said first input shaft, a second rearwardly extending transfer case output shaft (106) drivingly connected to said second input shaft and a third forwardly extending transfer case output shaft (110) for driving engagement with a vehicular front drive steer axle, said transfer case (102) apportioning torque supplied to said input shaft 25% to said first transfer case output shaft, 50% to said second transfer case output shaft and 25% to said third transfer case output shaft.

8. A tridem rear drive axle system (100) comprising a front-rear drive axle assembly (112), a middle-rear drive axle assembly (22) and a rear-rear drive axle assembly (24), said system characterized by;

said front-rear drive axle assembly (112) comprising a housing (120), a front-rear drive gear set (122,124), a first input shaft (118) in driving connection with said front-rear drive gear set and rotatably supported in and extending forwardly from said housing and a second input shaft (114) rotatably supported in and extending forwardly from said housing and drivingly connected to an output shaft (116) rotatably supported in said housing and extending therefrom, said output shaft in driving engagement with a third input shaft (28) rotatably supported in said middle-rear drive axle assembly and in driving engagement with a drive gear set (38,40,42) of said middle-rear drive axle assembly, said second input shaft and said output shaft noncoaxial with said independently rotatable relative to said first input shaft;

said middle-rear drive axle assembly (22) comprising a housing (26) rotatably supporting said third input shaft (28) and an interaxle differential assembly (32) driven by said third input shaft, said interaxle differential including a first side gear (34) in driving relation with said rear-rear drive axle assembly (24) and a second side gear (36) in driving relation with said middle-rear drive axle drive gear set; and a transfer case (130) having a first rearwardly extending transfer case output shaft (134) drivingly connected to said first input shaft and a second rearwardly extending transfer case output shaft (132) drivingly connected to said second input shaft, said second transfer case output shaft provided with twice the torque provided to said first transfer case output shaft.

* * * * *